(12) United States Patent
Oto

(10) Patent No.: US 8,654,801 B2
(45) Date of Patent: Feb. 18, 2014

(54) LIGHT SOURCE DEVICE, ANALYSIS DEVICE, AND LIGHT GENERATION METHOD

(71) Applicant: Fuji Electric Co., Ltd., Kawasaki (JP)

(72) Inventor: Masanori Oto, Yokohama (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 13/861,576

(22) Filed: Apr. 12, 2013

(65) Prior Publication Data

US 2013/0230066 A1 Sep. 5, 2013

Related U.S. Application Data

(63) Continuation of application No. PCT/JP2012/002433, filed on Apr. 6, 2012.

(30) Foreign Application Priority Data

May 25, 2011 (JP) ................................. 2011-117380

(51) Int. Cl.
*H01S 3/10* (2006.01)
(52) U.S. Cl.
USPC ...... 372/20; 372/21; 372/22; 372/6; 372/102; 372/29.014
(58) Field of Classification Search
USPC .................. 372/20, 21, 22, 6, 102, 29.014
See application file for complete search history.

(56) References Cited

U.S. PATENT DOCUMENTS 5,987,041 A * 11/1999 Taniguchi et al. .............. 372/12

| 6,101,023 | A | 8/2000 | Meyer et al. |
| 7,184,616 | B2 | 2/2007 | Mead et al. |
| 2004/0091004 | A1 | 5/2004 | Tojo |
| 2007/0183464 | A1* | 8/2007 | Poulsen et al. ..................... 372/6 |
| 2008/0013574 | A1* | 1/2008 | Furuya et al. ..................... 372/6 |
| 2008/0259973 | A1* | 10/2008 | Kim et al. ...................... 372/20 |
| 2010/0053720 | A1* | 3/2010 | Magari et al. ................. 359/244 |

FOREIGN PATENT DOCUMENTS

| JP | 4-277685 A | 10/1992 |
| JP | 7-226561 A | 8/1995 |
| JP | 11-007050 A | 1/1999 |
| JP | 2004-165393 A | 6/2004 |
| JP | 2008-028380 A | 2/2008 |

(Continued)

OTHER PUBLICATIONS

International Search Report issued May 1, 2012 for PCT/JP2012/002433.

*Primary Examiner* — Kinam Park
(74) *Attorney, Agent, or Firm* — Rossi, Kimms & McDowell LLP

(57) ABSTRACT

In aspects of the invention, wavelength conversion element has a harmonic generation portion and a parametric oscillation portion. The harmonic generation portion generates a harmonic of laser light output from a laser light source. The parametric oscillation portion generates signal light and idler light from the harmonic generated by the harmonic generation portion. In some aspects of the invention, electrodes and a first voltage control portion control the intensity of the harmonic generated by the harmonic generation portion. A first FBG (Fiber Bragg Grating) and a second FBG cause resonance of signal light output from the parametric oscillation portion. A piezo tube and a second voltage control portion change the resonance frequency of the first FBG and the second FBG.

7 Claims, 7 Drawing Sheets

(56) References Cited

FOREIGN PATENT DOCUMENTS

| JP | 2008-503888 | A | 2/2008 |
| JP | 2008-268945 | A | 11/2008 |
| JP | 2009-300702 | A | 12/2009 |
| WO | 2006075760 | A1 | 7/2006 |
| WO | 2008/096524 | A1 | 2/2008 |

* cited by examiner

LIGHT SOURCE DEVICE, ANALYSIS DEVICE, AND LIGHT GENERATION METHOD

CROSS-REFERENCE TO RELATED APPLICATIONS

This application is a continuation of International Application No. PCT/JP2012/002433, filed on Apr. 6, 2012, which is based on and claims priority to Japanese Patent Application No. JP 2011-117380, filed on May 25, 2011. The disclosure of the Japanese priority application and the PCT application in their entirety, including the drawings, claims, and the specification thereof, are incorporated herein by reference.

BACKGROUND

1. Field of the Invention

Embodiments of the invention relate to light source devices, analysis devices, and light source generation methods.

2. Related Art

In recent years, there have been advances in technologies relating to laser light. As a result, laser spectroscopy in which laser light absorption intensity is used to detect the amounts of specific materials in a sample has become more precise. However, there are no usable laser diodes at wavelengths from 490 nm to 630 nm. Hence as disclosed in Japanese Patent Application Laid-open No. 2008-28380 (also referred to herein as "Patent Reference 1") and International Patent Application No. WO 2006/075760 (also referred to herein as "Patent Reference 2"), for example, techniques have been developed in which near-infrared laser light is used to obtain light in the wavelengths band of 490 nm to 630 nm, with a wavelength conversion element.

For example, Patent Reference 1 discloses a light source device in which light emitted from a laser oscillator is incident on a wavelength conversion portion and is converted into a harmonic. In this light source device, the laser oscillator has, in order, a laser light source, first fiber grating, fiber, and second fiber grating. The reflection wavelength of the second fiber grating is shifted by applying a tensile stress. The power source of the tensile stress is a pulse motor.

Patent Reference 2 discloses a light source device in which two semiconductor laser light sources, the output light wavelengths of which are different, are connected by a coupler, and the outputs made incident on a wavelength conversion module. In this light source device, the difference frequency and sum frequency of the laser light from the two semiconductor laser light sources are generated in the wavelength conversion module. By changing the magnitude of the current input to one of the semiconductor laser light sources, the wavelengths are shifted.

In general, the width of gas absorption lines is narrow. Consequently when a sample is air or another gas, and the substance for detection is a gas, in order to perform laser spectroscopy with high precision, wavelength variability is necessary enabling the sweeping of absorption lines after having made the laser line width narrower than the absorption line width. Moreover, in order to improve the precision of measurement, the laser light intensity must be modulated at high speed.

However, in the technique disclosed in Patent Reference 1, control of the laser light source output itself is necessary in order to perform intensity modulation of laser light. In this case, performing intensity modulation of laser light at high speed is difficult. And in the technique disclosed in Patent Reference 2, in order to change the wavelength of the output light, the current input to a semiconductor laser light source must be changed, and the laser light source wavelength and intensity cannot be controlled mutually independently.

Thus, as is described above, there is a need in the art for an improved light source device.

SUMMARY OF THE INVENTION

Embodiments of the invention address these and other needs. In some embodiments, the provision of a light source device, analysis device, and light generation method in which the line width of output laser light is narrow, wavelength switching and intensity modulation can be performed at high speed, and moreover wavelength switching and intensity modulation can be controlled mutually independently.

In some embodiments, a light source device has a laser light source, a wavelength conversion element, an intensity control portion, a resonator, and a resonance control portion. The wavelength conversion element has a harmonic generation portion and a parametric oscillation portion. The harmonic generation portion generates a harmonic of laser light output from the laser light source. The parametric oscillation portion generates signal light and idler light from the harmonic generated by the harmonic generation portion. The intensity control portion is provided separately from the laser light source, and controls the intensity of the harmonic generated by the harmonic generation portion. The resonator causes resonance of the signal light output from the parametric oscillation portion. The resonance control portion changes a resonance frequency of the resonator.

By way of some embodiments, of the signal light, only the component having the resonance wavelength in the resonator is output. Hence the line width of the output laser light is narrow. Further, wavelength switching is performed by controlling the resonance frequency of the resonator, and intensity modulation is performed by the intensity control portion provided separately from the laser light source. Hence wavelength switching and intensity modulation can be performed at high speed, and can be controlled mutually independently.

An analysis device in accordance with some embodiments has the abovementioned light source device and an analysis portion. The analysis portion irradiates a sample with light output from the light source device, and measures an amount of absorption of light in the sample.

In some embodiments of a method of light generation, laser light is made incident on a wavelength conversion element, and signal light of wavelength shorter than the laser light is generated and is output from the wavelength conversion element. The wavelength conversion element has a harmonic generation portion and a parametric oscillation portion. The harmonic generation portion generates a harmonic of the laser light output from a laser light source. The parametric oscillation portion generates signal light and idler light from the harmonic generated by the harmonic generation portion. By changing an intensity of the harmonic generated by the harmonic generation portion, an intensity of the output light is changed. Further, a resonator which causes resonance of the signal light is provided, and a frequency of output light is changed by controlling a resonance frequency of the resonator.

By way of some embodiments, with the line width of output laser light made narrow, wavelength switching and intensity modulation can be performed at high speed, and can be controlled mutually independently.

BRIEF DESCRIPTION OF THE DRAWINGS

The above-described features and advantageous effects will become clear through the embodiments described below, and through the following drawings appended thereto.

DETAILED DESCRIPTION

Figure 1:
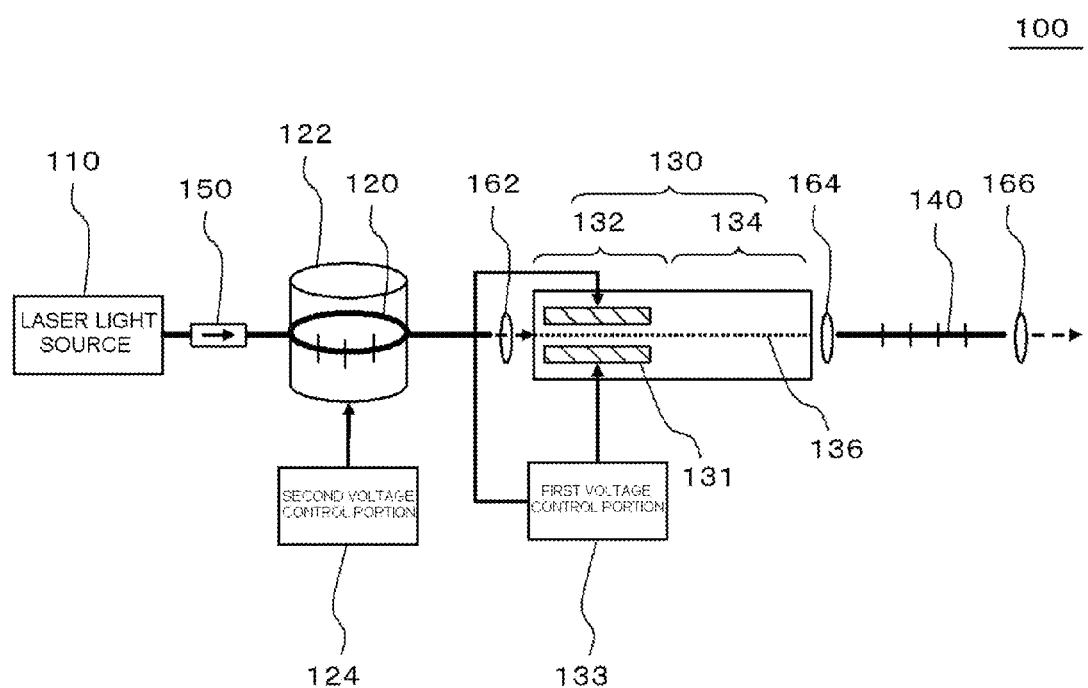
FIG. 1 shows the configuration of the light source device of a first embodiment of the invention.

Below, embodiments of the invention are explained using the drawings. In general, in the drawings, the same constituent elements are assigned the same symbols, and explanations are omitted as appropriate.

(First Embodiment)

FIG. 1 shows the configuration of the light source device 100 of a first embodiment. The light source device 100 comprises one laser light source 110, a wavelength conversion element 130, an electrode 131 and first voltage control portion 133 (intensity control portion), a first FBG (Fiber Bragg Grating) 120 and second FBG 140 (resonator), a piezo tube 122, and a second voltage control portion 124 (resonance control portion). The wavelength conversion element 130 has a harmonic generation portion 132 and a parametric oscillation portion 134.

The harmonic generation portion 132 generates a harmonic of laser light (pump light) output from the laser light source 110. The parametric oscillation portion 134 generates signal light and idler light from the harmonic generated by the harmonic generation portion 132. The electrode 131 and first voltage control portion 133 control the intensity of the harmonic generated by the harmonic generation portion 132. That is, in this embodiment the intensity of the harmonic can be controlled even when the input to the laser light source 110 is not changed. The first FBG 120 and second FBG 140 cause resonance of the signal light output from the parametric oscillation portion 134. The piezo tube 122 and second voltage control portion 124 change the resonance frequency of the first FBG 120 and second FBG 140. A detailed explanation is given below.

The laser light source 110 is for example a fiber laser, but may be a laser diode (semiconductor laser) or a solid state laser. The device to use as the laser light source 110 is selected according to the wavelength of the light to be output from the light source device.

Laser light output from the laser light source 110 is input to a polarization-maintaining fiber via an isolator 150. The first FBG 120 is provided at a portion of this polarization-maintaining fiber. The first FBG 120 is wound around the piezo tube 122, and stress is applied to the first FBG 120 in the direction of extension accompanying expansion and contraction of the piezo tube 122. The voltage input to the piezo tube 122 is controlled by the second voltage control portion 124. That is, expansion and contraction of the piezo tube 122 is controlled by the second voltage control portion 124.

Laser light output from the polarization-maintaining fiber is input to the waveguide 136 of the wavelength conversion element 130 via the lens 162. The wavelength conversion element 130 is for example a quasi-phase matching element. The wavelength conversion element 130 has the harmonic generation portion 132 on the side on which the laser light is incident, and has the parametric oscillation portion 134 on the side on which laser light is output. That is, when laser light is incident on the wavelength conversion element 130, the harmonic generation portion 132 generates a harmonic of the incident laser light. And the parametric oscillation portion 134 generates signal light and idler light of the harmonic generated by the harmonic generation portion 132.

Of the wavelength conversion element 130, an electrode 131 is provided in the region in which the harmonic generation portion 132 is formed. A voltage is applied to the electrode 131 by the first voltage control portion 133. By controlling the voltage applied to the electrode 131, the intensity of the harmonic output from the harmonic generation portion 132 is controlled. This mechanism is explained below using FIG. 2.

Signal light output from the waveguide 136 of the wavelength conversion element 130 is input to the polarization-maintaining fiber via the lens 164, and is then output from the polarization-maintaining fiber via the lens 166. The second FBG 140 is provided in one portion of this polarization-maintaining fiber. A signal light resonator is formed by the first FBG 120 and second FBG 140. It is preferable that the reflectance of signal light at the first FBG 120 be higher than the reflectance of signal light at the second FBG 140.

The wavelength distribution of signal light, in the state at which the light is output from the wavelength conversion element 130, has a certain width. Of the signal light with this width, that output from the second FBG 140 has only a component with the same frequency as the resonance frequency of the resonator comprising the first FBG 120 and second FBG 140.

Here the first FBG 120 is wound around the piezo tube 122, so that expansion and contraction of the piezo tube 122 is accompanied by the application of stress in the direction of extension of the first FBG 120. When the first FBG 120 is extended, the resonance frequency of the resonator comprising the first FBG 120 and the second FBG 140 changes. Consequently by using the second voltage control portion 124 to control the voltage applied to the piezo tube 122, the frequency of light output from the light source device 100 can be controlled. For example, by continuously changing the voltage applied to the piezo tube 122 by the second voltage control portion 124, the frequency of light output from the light source device 100 changes continuously.

In the example of FIG. 1, light is input to and output from the interval between the fibers and the element via lenses, but potting can also be used.

Figure 2:
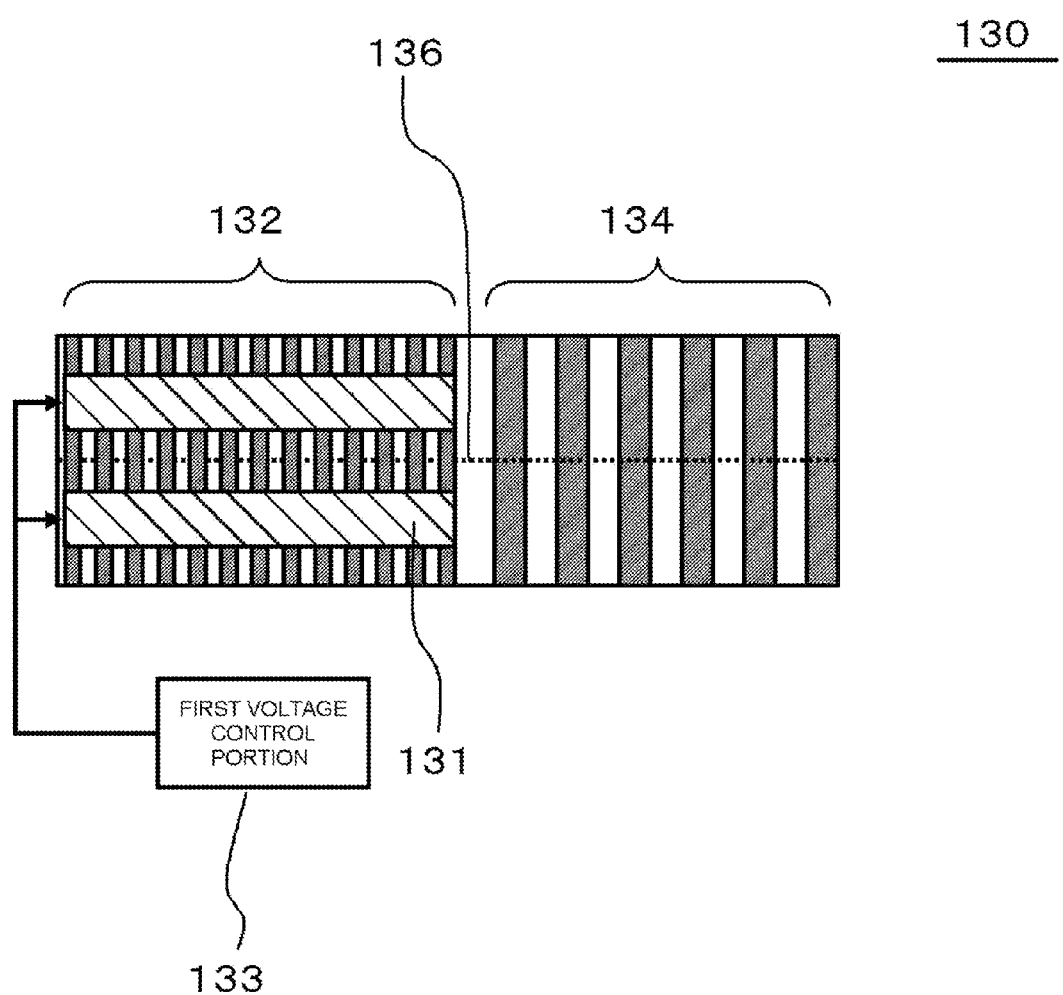
FIG. 2 shows the configuration of a wavelength conversion element.

FIG. 2 shows the configuration of the wavelength conversion element 130. In the example shown in the figure, the wavelength conversion element 130 is a quasi-phase matching element, and is for example formed from a ferroelectric crystal such as $LiNbO_3$ or $LiTaO_3$. The wavelength conversion element 130 has periodic polarization inversion regions. The period of the polarization inversions in the harmonic generation portion 132 is smaller than the period of polarization inversions in the parametric oscillation portion 134. These polarization inversion periods are determined by the wavelength of the light to be output by the light source device 100.

On the upper and lower faces of the harmonic generation portion 132 are provided electrodes 131. When a voltage is applied across these electrodes 131, the quasi-phase matching condition within the harmonic generation portion 132 is disturbed. When the quasi-phase matching condition in the harmonic generation portion 132 is disturbed, the intensity of the harmonic generated by the harmonic generation portion 132 is reduced in proportion to the degree of disturbance. That is, the first voltage control portion 133, by controlling the voltage applied to the electrodes 131, controls the intensity of light output from the light source device 100.

The temperature of the wavelength conversion element 130 is for example controlled using a Peltier element.

Next, action and advantageous results of the embodiment are explained. In this embodiment, light output from the light source device 100 is only the component of the signal light, output from the wavelength conversion element 130, having the same frequency as the resonance frequency of the resonator comprising the first FBG 120 and second FBG 140. Hence the line width of light output from the light source device 100 is narrow. Further, by controlling the voltage applied by the first voltage control portion 133 to the electrodes 131, the intensity of light output from the light source device 100 is controlled. Further, by controlling the voltage applied to the first FBG 120 by the second voltage control portion 124, the frequency of light output from the light source device 100 can be controlled. Hence wavelength switching and intensity modulation can be performed at high speed, and mutually independent control is possible.

(Second Embodiment)

Figure 3:
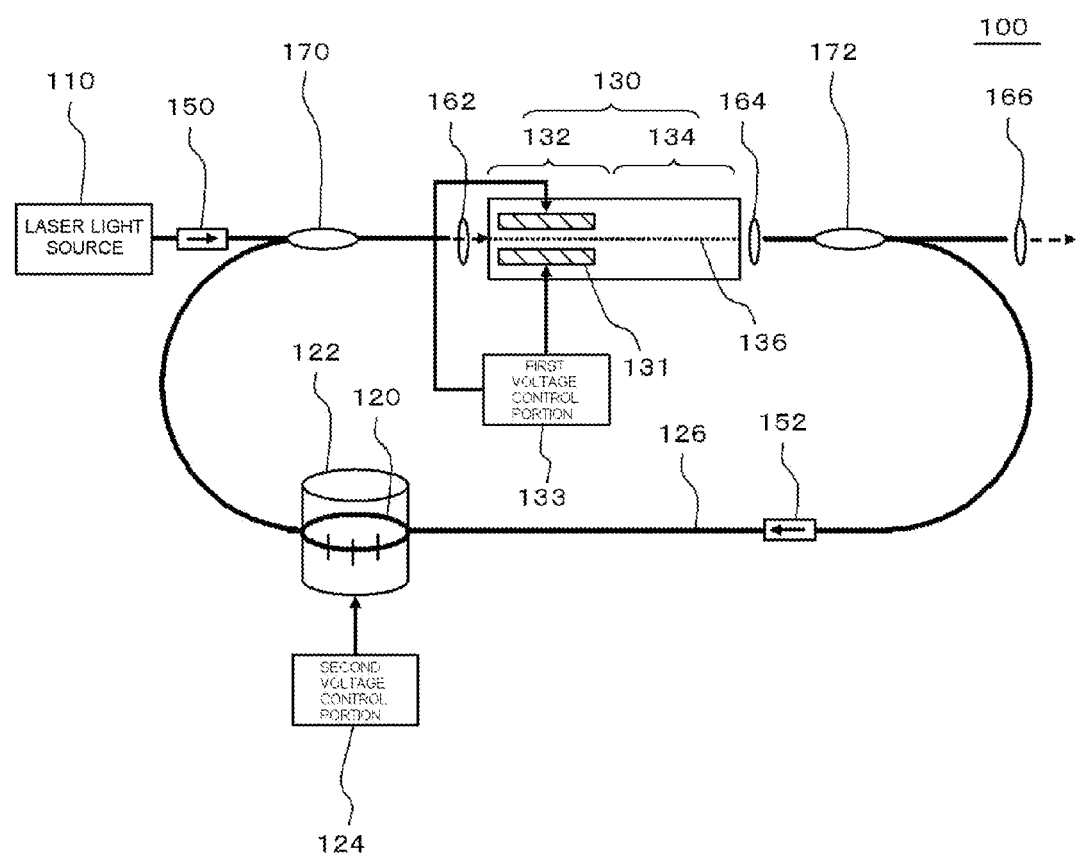
FIG. 3 shows the configuration of the light source device of a second embodiment.

FIG. 3 shows the configuration of the light source device 100 of a second embodiment. The light source device 100 in this embodiment has the same configuration as the light source device 100 of the first embodiment, except for the configuration of the resonator.

In this embodiment, the polarization-maintaining fiber positioned between the wavelength conversion element 130 and the lens 166 is provided with a coupler 172, and a coupler 170 is provided between the laser light source 110 and the wavelength conversion element 130. In the coupler 172, the polarization-maintaining fiber branches into a direction toward the lens 166 and another direction. The latter polarization-maintaining fiber 126 is connected to the coupler 170 via the isolator 152. That is, the output side of the wavelength conversion element 130 and the input side of the wavelength conversion element 130 are connected via the polarization-maintaining fiber 126.

The first FBG 120 is provided in the polarization-maintaining fiber 126. The first FBG 120 is wound around the piezo tube 122. The second voltage control portion 124 inputs a voltage to the piezo tube 122.

That is, in this embodiment a ring resonator is formed by the polarization-maintaining fiber 126 and the first FBG 120. The resonance frequency of this ring resonator is controlled by application of a voltage to the piezo tube 122 by the second voltage control portion 124. That is, in this embodiment the second voltage control portion 124 can control the frequency of light output from the light source device 100 by controlling the voltage applied to the first FBG 120. Hence by means of this embodiment, even though there is a single FBG, advantageous results similar to those of the first embodiment can be obtained.

(Third Embodiment)

Figure 4:
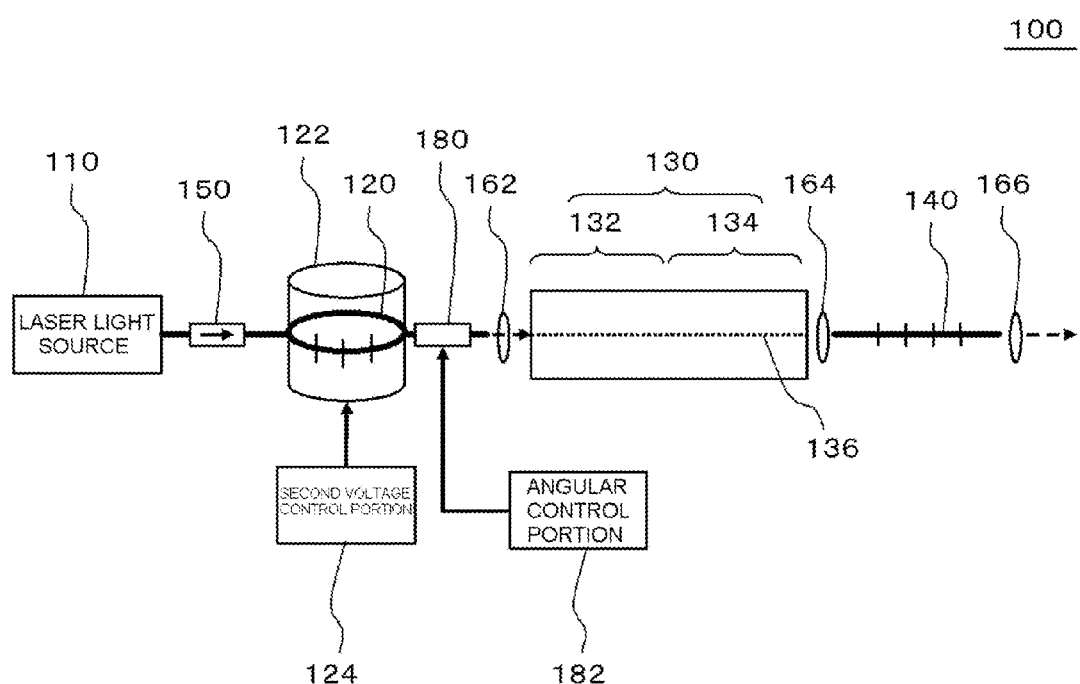
FIG. 4 shows the configuration of the light source device of a third embodiment.

FIG. 4 shows the configuration of the light source device 100 of a third embodiment. The light source device 100 in this embodiment has the same configuration as the light source device 100 of the first embodiment, except in the following respects.

First, electrodes 131 are not provided in the harmonic generation portion 132 of the wavelength conversion element 130. Hence a first voltage control portion 133 is also not provided in the light source device 100.

The polarization-maintaining fiber positioned between the laser light source 110 and the wavelength conversion element 130 has a polarization modulator 180 in the portion positioned between the first FBG 120 and the lens 162. The polarization modulator 180 modulates the polarization plane of the laser light output from the laser light source 110. Modulation by the polarization modulator 180 is controlled by an angular control portion 182. The intensity of the harmonic in the harmonic generation portion 132 of the wavelength conversion element 130 changes with the angle of the polarization plane of the laser light input to the harmonic generation portion 132. That is, in this embodiment the angular control portion 182 controls the intensity of the harmonic generated by the harmonic generation portion 132 by controlling the angle of the polarization plane in the polarization modulator 180.

Hence by means of this embodiment also, advantageous results similar to those of the first embodiment can be obtained.

(Fourth Embodiment)

Figure 5:
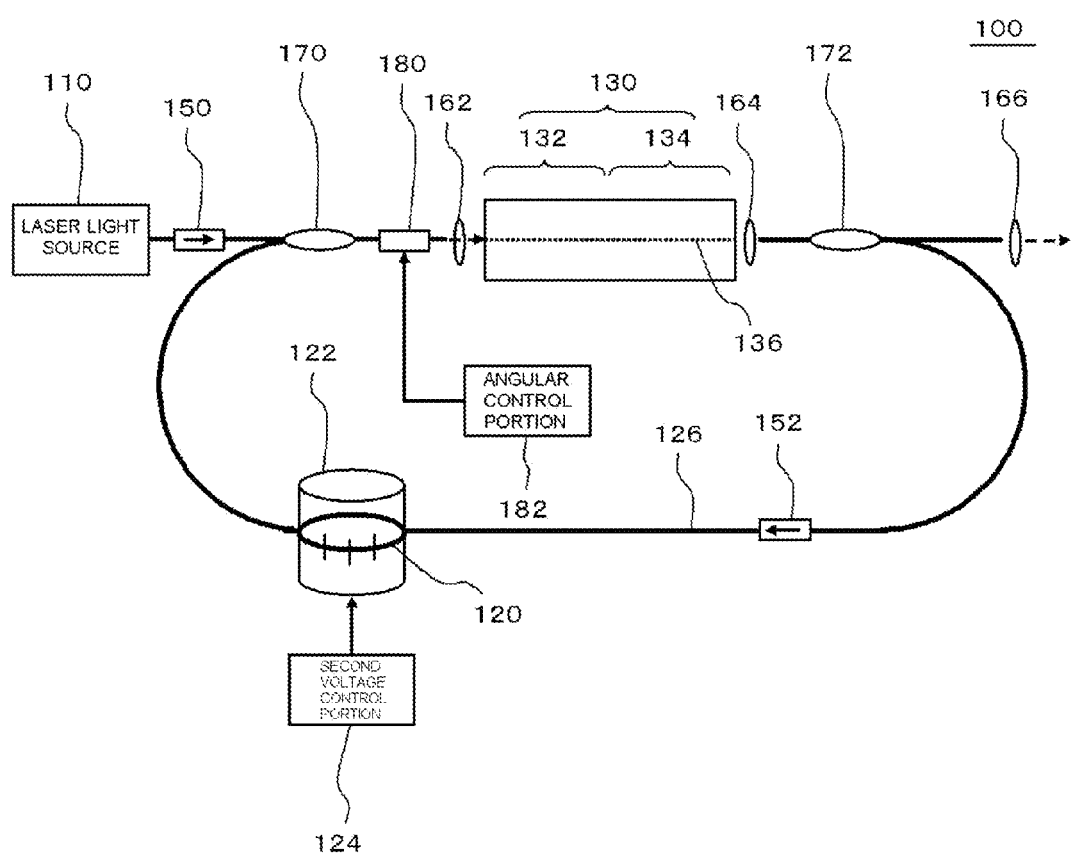
FIG. 5 shows the configuration of the light source device of a fourth embodiment.

FIG. 5 shows the configuration of the light source device 100 of a fourth embodiment. In this embodiment, the light source device 100 has a configuration similar to the light source device of the second embodiment, except for the fact of having the polarization modulator 180 and angular control portion 182 described in the third embodiment instead of the electrodes 131 and first voltage control portion 133.

By means of this embodiment also, advantageous results similar to those of the second embodiment can be obtained.

(Fifth Embodiment)

Figure 6:
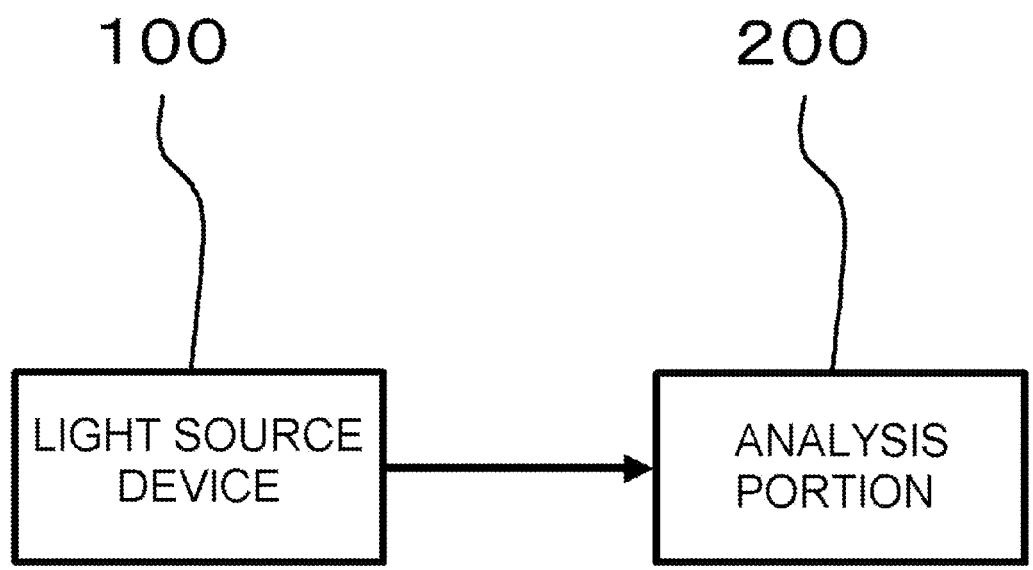
FIG. 6 shows the configuration of the light source device of a fifth embodiment.

FIG. 6 shows the configuration of the analysis device of a fifth embodiment. This analysis device has a light source device 100 and an analysis portion 200. The light source device 100 has the configuration described in any one of the first through fourth embodiments. The analysis portion 200 irradiates a sample with light output from the light source device 100, and measures the amount of absorption of light in the sample. The sample is for example air or another gas. The analysis portion 200 detects the amount of a specific component (for example, a radical, or carbon dioxide or another gas) included in the sample by measuring the amount of absorption of light in the sample. When the component for detection is carbon dioxide, light output by the light source device 100 is variable between 490 nm and 630 nm. In this case, the laser light source 110 (shown in FIG. 1, FIG. 3, FIG. 4 and FIG. 5) of the light source device 100 outputs light in the near-infrared region.

As described above, the laser light output from the light source device 100 has a narrow line width, and wavelength switching and intensity modulation can be performed at high speed. Further, in the light source device 100, wavelength switching and intensity modulation can be controlled mutually independently. Hence by means of the analysis device shown in FIG. 6, measurement of the light absorption spectrum of a sample can be performed rapidly.

EXAMPLE

The absorption spectrum of Na vapor was measured using the analysis device shown in FIG. 6. The configuration of the light source device 100 was as in the first embodiment. A Yb doped fiber laser with an oscillation wavelength of 1.064 μm was used as the laser light source 110. A quasi-phase matching element comprising LiNbO$_3$ was used in the wavelength conversion element 130. The polarization inversion period in the harmonic generation portion 132 was 6.9 μm, and the polarization inversion period in the parametric oscillation portion 134 was 12.5 μm.

In the harmonic generation portion 132, the second harmonic, of wavelength 532 nm, was obtained. In the parametric oscillation portion 134, signal light with a peak at 589 nm and idler light at 5500 nm were obtained.

Using this signal light, the absorption spectrum of Na vapor was measured. At the time of measurement, by continuously changing the voltage applied by the second voltage control portion 124 to the piezo tube 122, the wavelength of the light output from the light source device 100 was swept. Further, by changing the voltage applied to the electrodes 131 by the first voltage control portion 133, the intensity of the light output from the light source device 100 was modulated at high speed, and synchronous detection of measurement results before and after modulation was performed.

Figure 7:
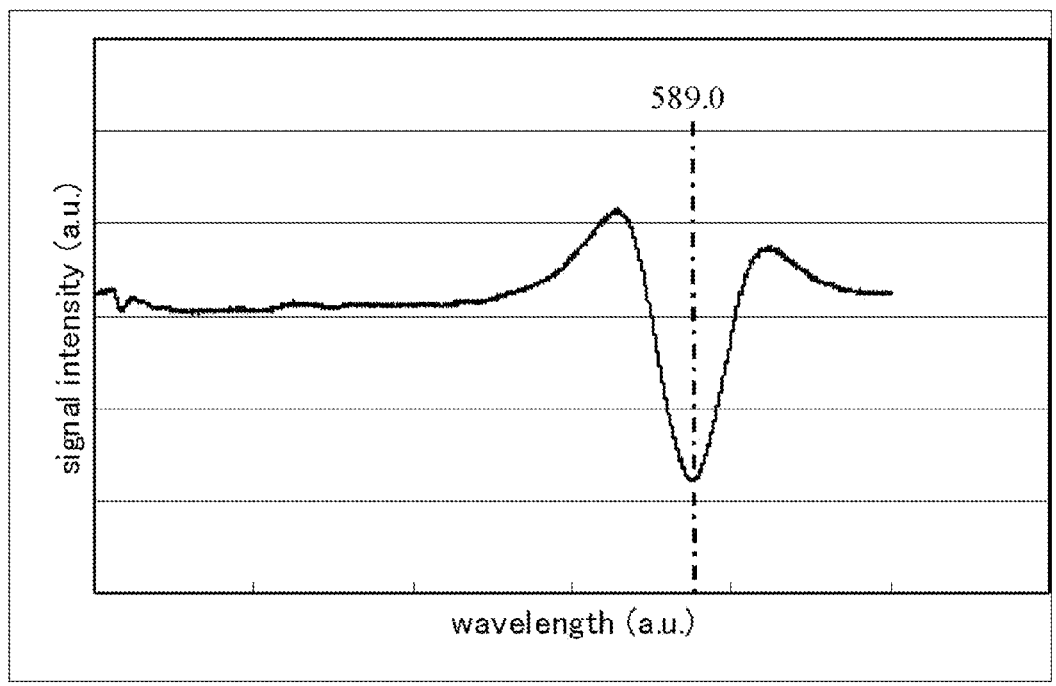
FIG. 7 shows measurement results for an example.

Measurement results are shown in FIG. 7. From FIG. 7, it is seen that the absorption line of Na vapor could be measured satisfactorily.

In the above, embodiments of the invention have been explained referring to the drawings; but these embodiments are examples of the invention, and various other configurations can be adopted. For example, a light source device 100 may be used as a light source for measurement in medicine, biology, or other measurement fields. Further, the method of applying stress to the first FBG 120 is not limited to the examples described in the above embodiments. Further, the harmonic generation portion 132 and parametric oscillation portion 134 may be provided as separate elements.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

What is claimed is:

1. A light source device, comprising:
    a laser light source;
    a wavelength conversion element, having a harmonic generation portion which generates a harmonic of laser light output from the laser light source, and a parametric oscillation portion which generates a signal light and an idler light from the harmonic generated by the harmonic generation portion;
    an intensity control portion, which is provided separately from the laser light source, and controls an intensity of the harmonic generated by the harmonic generation portion;
    a resonator, which causes resonance of the signal light output from the parametric oscillation portion; and
    a resonance control portion, which changes a resonance frequency of the resonator,
    wherein the resonator includes a FBG (Fiber Bragg Grating) which connects an input side and an output side of the wavelength conversion element, and
    the resonance control portion changes the resonance frequency of the resonator by applying stress to the FBG in a direction of extension of this FBG.

2. The light source device according to claim 1, wherein the intensity control portion controls the intensity of the harmonic by disturbing a phase matching condition of the laser light in the harmonic generation portion.

3. The light source device according to claim 2, wherein the intensity control portion includes:
    an electrode provided at the harmonic generation portion; and
    a first voltage control portion which controls a voltage applied to the electrode.

4. The light source device according to claim 1, wherein the intensity control portion includes:
    a polarization modulator, which is provided between the laser light source and the wavelength conversion element, and changes an angle of a polarization plane of the laser light; and
    an angular control portion which controls the angle of the polarization plane of the laser light by controlling the polarization modulator.

5. The light source device according to claim 1, wherein the resonance control portion includes:
    a piezo tube around which the FBG is wound; and
    a second voltage control portion which controls a voltage applied to the piezo tube.

6. The light source device according to claim 1, wherein a wavelength of the laser light is in a near infrared region, and
    a wavelength of light output from the light source device is between 490 nm and 630 nm.

7. A method of generation of light, in which laser light is input to a wavelength conversion element and signal light of wavelength shorter than the laser light is generated and is output from the wavelength conversion element,
    wherein the wavelength conversion element has a harmonic generation portion which generates a harmonic of the laser light, and a parametric oscillation portion which generates a signal light and an idler light from the harmonic generated by the harmonic generation portion,
    an intensity of output light is changed by changing a intensity of the harmonic generated by the harmonic generation portion, and
    a resonator which causes resonance of the signal light is provided, and a frequency of output light is changed by controlling a resonance frequency of the resonator.

* * * * *